(12) United States Patent
Dünner

(10) Patent No.: US 8,590,435 B2
(45) Date of Patent: Nov. 26, 2013

(54) FLEXIBLE GUIDE BUSHING FOR MACHINE TOOL

(76) Inventor: Daniel Dünner, Moutier (CH)

( * ) Notice: Subject to any disclaimer, the term of this patent is extended or adjusted under 35 U.S.C. 154(b) by 236 days.

(21) Appl. No.: 13/124,539

(22) PCT Filed: Oct. 15, 2008

(86) PCT No.: PCT/CH2008/000433
§ 371 (c)(1),
(2), (4) Date: Apr. 15, 2011

(87) PCT Pub. No.: WO2010/043058
PCT Pub. Date: Apr. 22, 2010

(65) Prior Publication Data
US 2011/0252932 A1    Oct. 20, 2011

(51) Int. Cl.
*B23B 13/00* (2006.01)

(52) U.S. Cl.
USPC .............. 82/127; 279/43.7; 279/46.8

(58) Field of Classification Search
CPC .................. B23B 13/08; B23B 13/00
USPC ............ 279/43.7, 43.8, 46.8, 46.9, 43.6, 139, 279/55; 82/127, 126, 125
See application file for complete search history.

(56) References Cited

U.S. PATENT DOCUMENTS

| 1,926,760 | A | * | 9/1933 | Albrecht | 279/60 |
| 2,346,706 | A |   | 4/1944 | Stoner |  |
| 2,452,184 | A | * | 10/1948 | Cole | 285/154.1 |
| 2,817,535 | A | * | 12/1957 | Linzell | 279/55 |
| 2,829,899 | A | * | 4/1958 | Cochran et al. | 279/2.02 |
| 2,835,496 | A | * | 5/1958 | Hall | 279/46.7 |
| 3,464,710 | A | * | 9/1969 | Schultz et al. | 279/4.08 |
| 3,539,193 | A | * | 11/1970 | Parsons | 279/51 |
| 3,756,612 | A | * | 9/1973 | Peterson | 279/20.1 |
| 5,324,050 | A | * | 6/1994 | Kanaan | 279/46.7 |
| 2004/0051257 | A1 | * | 3/2004 | Rall | 279/43.7 |
| 2004/0239054 | A1 | * | 12/2004 | Weller | 279/55 |

FOREIGN PATENT DOCUMENTS

| CH | 574302 | A5 |   | 4/1976 |  |
| DE | 102005024840 |   | * | 1/2008 | B23B 13/02 |
| FR | 2517576 |   | * | 6/1983 | B23B 13/12 |
| FR | 2817181 | A |   | 5/2002 |  |

OTHER PUBLICATIONS

International Search Report dated Jul. 27, 2009, issued in corresponding international application No. PCT/CH2008/000433.

* cited by examiner

*Primary Examiner* — Andrea Wellington
*Assistant Examiner* — Ryan Rufo
(74) *Attorney, Agent, or Firm* — Ostrolenk Faber LLP

(57) ABSTRACT

The guide bushing (1) for a machine tool, especially for an automatic lathe, includes at least two segments (2), each segment being connected on both sides to a neighboring segment by an elastic means (3) in order to form an axisymmetric body of axis (1A) and has a central opening (10) enabling a bar to be machined to pass through, each of the elastic means (3) extends axially along the axis (1A) in a groove (8) of the guide bushing.

11 Claims, 2 Drawing Sheets

FLEXIBLE GUIDE BUSHING FOR MACHINE TOOL

CROSS REFERENCE TO RELATED APPLICATIONS

The present application is a 35 U.S.C. §371 National Phase conversion of PCT/CH2008/000433, filed Oct. 15, 2008, the disclosure of which is incorporated herein by reference. The PCT International Application was published in the French language.

BACKGROUND OF THE INVENTION

The present invention relates to a flexible guide bushing for a machine tool.

This bushing type is designed and used for guiding rods or bars to be machined whose diameter is essentially in a range of from 1 mm to about forty mm on an automatic sliding headstock lathe. It should therefore be differentiated from a collet even though it may exceptionally be used for such an application.

Although the use of rigid guide bushings is still common today, it is not free of problems. One of them is that of the adjustment of the gripping force applied by the bushing to the bar. Indeed, the correct guidance of the latter is decisive for machining quality since an excessive gripping force results in an excessive clamping action that in turn will cause a seizure of the bar, and inversely, an insufficient force will let the bar float, thereby leading to a machining imprecision that increases with the rotational speed of the machined bars. Directly linked to this problem is that of the non-parallelism of the guiding sectors or segments with respect to the axis of rotation on their entire length. Another problem results from the fact that the nominal diameter of a bar is generally not perfectly uniform on its entire length and furthermore the operating range of a given usual bushing is of the order of +0.01 mm to −0.03 mm. The smaller the diameter of the bar, the greater the risk of causing marks on the machined workpieces.

To resolve these problems, flexible guide bushings have been designed.

Currently available on the market is a flexible guide bushing comprising, in a known manner, three sectors that are autonomous as such and connected to each other by elastic members exerting opposed forces. On one hand, outer circular springs serve to maintain the sectors under the action of radial forces directed toward the axis of the bushing. On the other hand, inner compression springs whose axis is orthogonal to the axis of the bushing, i.e. that are arranged tangentially, rest in corresponding seats and serve to spread them apart on their entire length. The whole assembly forms a body that is partly cylindrical and partly frustoconical. After a short operating time, fatigue particularly of the inner springs causes positioning errors of the sectors relative to one another, which errors are amplified by the shocks that may occur when new bars are being loaded. Furthermore, machining chips may pass between the gaps and impair the correct operation of the compression springs. In other words, a precise machining operation will rapidly become impossible since the lifetime of these guide bushings is extremely short.

Another known flexible guide bushing comprises three segments that are interconnected to form a partly cylindrical and partly frustoconical body. A particular bushing can be used for processing bars whose diameter is in a given range. The segments are connected by means of vulcanized rubber in the radial spaces and gaps. It can be said that the stability of this bushing is all but ideal because of the decreasing contact surfaces of the rubber connecting elements with increasing bar diameter and of the non-uniform distribution of the gripping forces applied thereto, more specifically of an absence of force in the middle zone of the bar since the latter is only retained at its ends, which causes are aggravated by a premature deterioration of the connecting elements that is observed during the axial displacement of a bar being machined and due to chips that may remain inside the bushing. The instability of the bushing during machining is a result of its design itself, but above all it will increase over time and thus increasingly prejudice the machining quality.

SUMMARY OF THE INVENTION

The object of the present invention is to provide a flexible guide bushing for the machining of bars on a machine tool, more particularly an automatic lathe, that simultaneously ensures an adequate, uniform and reliable lateral grip of the bar—an indispensable condition for carrying out a machining of optimum quality of the bar—and concomitantly eliminates the other disadvantages of which the mentioned bushings of this type suffer.

This object is attained by the means defined in this application.

The numerous advantages that have been found in multiple tests conducted under all conditions and that distinguish the guide bushing of the invention from those of the prior art will be easily understood from the detailed description of a non-limiting example of an embodiment of this guide bushing with reference to the accompanying drawing, where:

DESCRIPTION OF PREFERRED EMBODIMENTS

Figure 1:
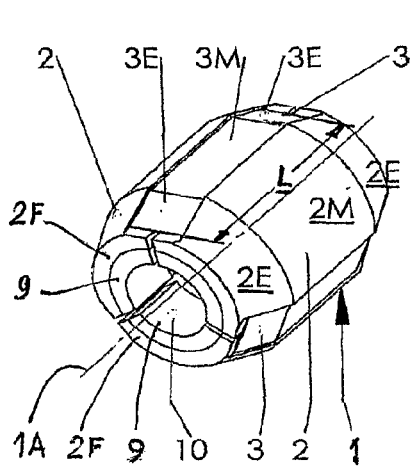
FIG. 1 is a perspective view of the guide bushing.

In the figures, elements of the guide bushing that are identical to one another are designated by the same reference numerals. Bushing 1 has a generally tubular shape with a central opening 10 and an axis 1A that results from the interconnection of at least two identical segments 2, preferably of three segments 2 (see FIG. 3, where the angle α, according to this example, is consequently equal to 120°), these segments extending axially, i.e. in parallel to axis 1A, and having two flanks 4 that are shaped so as to allow the aforementioned connection (see below). The profile of the outer envelope of a segment is such that a generating line (not shown) generates in its rotation around axis 1A a cylindrical surface on an intermediate portion 2M and, on end portions 2E on both sides thereof, like the bushings of this type and in a known manner, frustoconical surfaces that are adapted to the surfaces of a movable piston of a mandrel (these elements are not shown) whose actuation allows closing and opening the bushing and, on the other hand, to the surfaces of a fixed clamping cap (not shown either). It should be noted that the aforementioned term "tubular" is not meant to be understood in the narrow sense as intermediate portion 2M need not necessarily or exclusively be cylindrical in view of possible design constraints that have to be respected.

Figure 4:
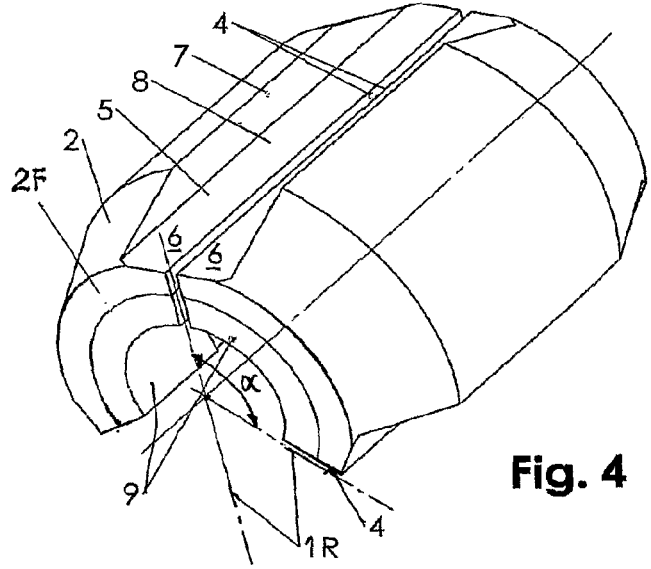
FIG. 4 is an enlarged perspective view of two adjacent segments without the connecting element.

FIG. 4 shows two adjacent segments 2 in more detail. Each of the (non-referenced) respective planes of longitudinal flanks 4 of the two adjacent segments 2 is parallel to a radial axis 1R. Each flank 4 has a flat 6 whose plane (not referenced) is orthogonal to this axis 1R, on one hand, and on the other hand, a shoulder 7 having an outer edge 7E whose plane (not referenced) is parallel to that same axis 1R, i.e. perpendicular to flat 6. These surfaces 6, 7 thus form a cutout 5 for each flank 4 in the shape of a capital "L". The flanks 4 of the two adjacent segments 2 thus form two capital "L" letters, one being oriented in one direction and the other one being oriented in the opposite direction.

The connecting elements connecting two adjacent segments 2 are formed of tongues 3 of an elastic material having the shape of an obelisk or of a parallelepiped of defined dimensions L×l×h (see FIGS. 1 and 3) in the present example. On both sides of an intermediate portion 3M in the shape of a straight parallelepiped, end portions 3E in the shape of prisms extend whose upper surfaces (not referenced) are chamfered. The length L of the rectangular base surface 3B is equal (or at least approximately equal) to the length of the bushing (for the latter, a value of at least about thirty mm will preferably be chosen).

In the assembled condition, cutouts 5 of two facing elements 2 form a seat 8 in the form of a longitudinal groove that extends in parallel to axis 1A and in which a tongue 3 is arranged and fixed, advantageously by vulcanization, gluing, or casting. Seat 8, and consequently flanks 4, flats 6, and shoulders 7 are so dimensioned that as a function of width l of tongue 3, the two flanks 4 are maintained at a distance d from one another that is defined too, the mentioned width l being in turn determined as a function of the clamping force and of the characteristics of the elastic material that is used. According to a non-represented variant, the cross-section of the tongue may have an protuberance on its entire length that extends into gap d, for a limited distance so that this protuberance does not interfere with the diameter of opening 10. The visible surfaces 3T of the three tongues 3 are approximately flush with the envelope (not specifically referenced) of the bushing, a slight setback from the latter that is visible in FIGS. 2 and 3 being provided in that the upper surface 3T of each tongue 3 lies slightly beneath outer edges 7E of shoulders 7 in each segment 2.

Figure 5:
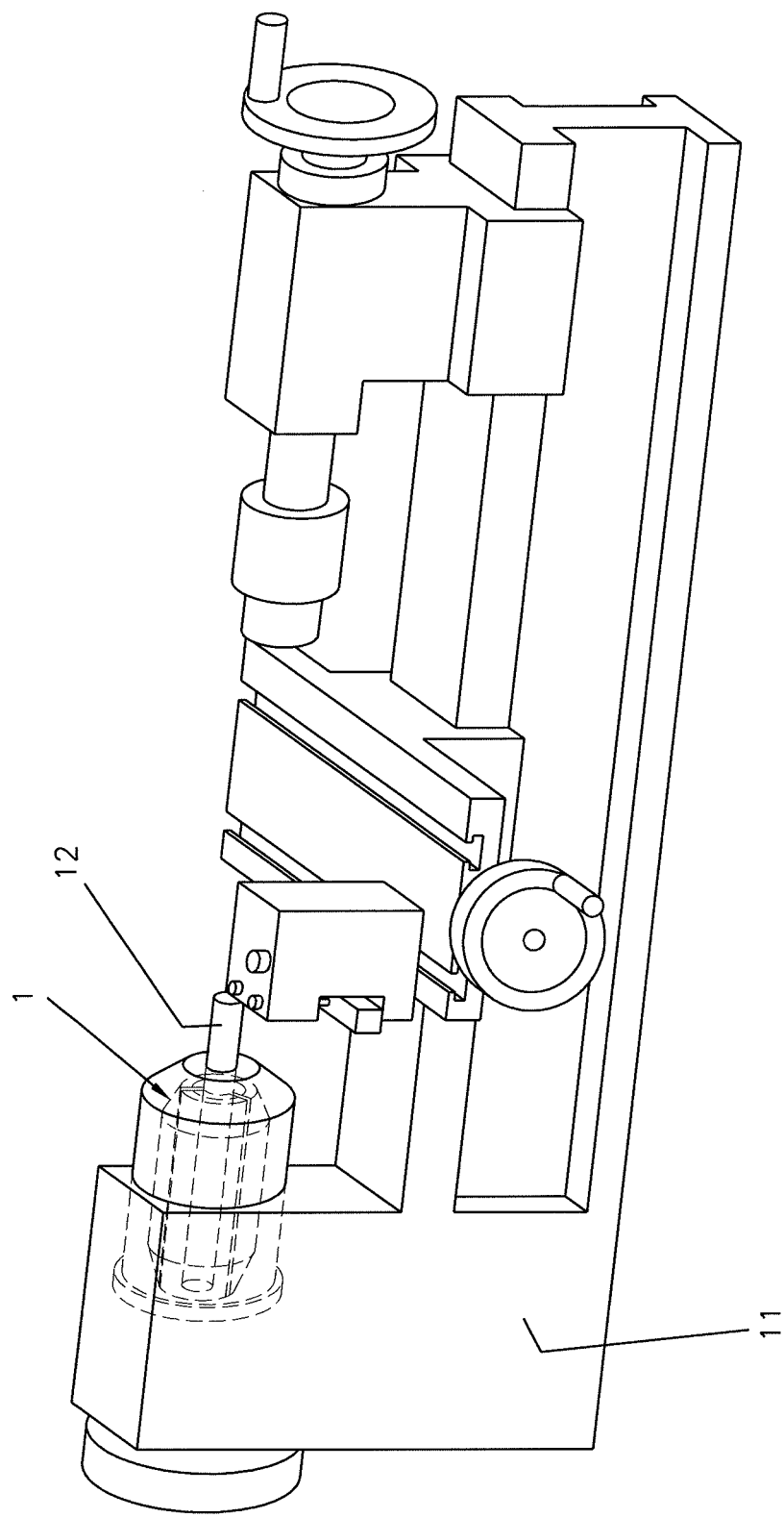
FIG. 5 is a perspective view showing the guide bushing in an automatic lathe, the guide bushing holding a bar during machining of the bar.

FIG. 5 shows guide bushing 1 in an automatic lathe 11 during machining of a bar 12.

Figure 2:
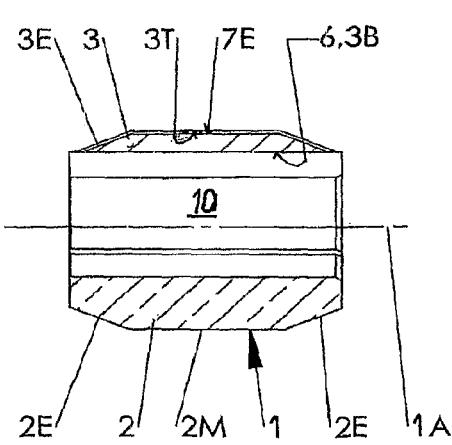
FIG. 2 is an axial section thereof according to line II-II in FIG. 3.
Figure 3:
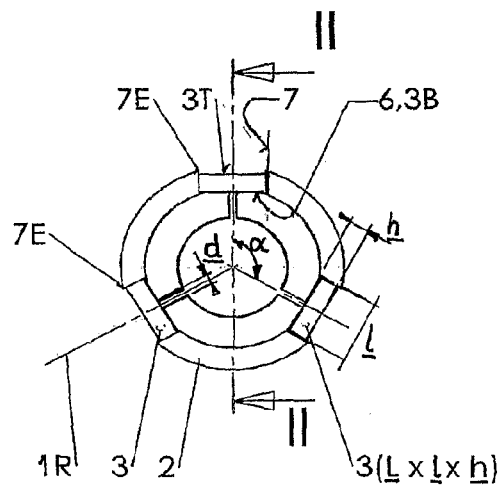
FIG. 3 is a lateral view of the guide bushing.

It is readily understood that the clamping action of the bushing for blocking a bar to be machined in opening 10 causes an elastic deformation of each tongue 3. On one hand, the distance d will decrease to a value d', the initial value d being calculated such that in the closed condition, d' remains greater than zero. The difference between d and d' will be very small if a protuberance (see above) is provided, whereas it may be more pronounced if the lower surface 3B of the tongue is a plane (as represented in FIGS. 1, 2, and 3). On the other hand, the chamfered surfaces of portions 3E, which correspond to the frustoconical portions 2E formed by segments 2, adapt at least partly to the shape of the cone of the clamping piston and of the clamping cap. Analogously, surfaces 3T of intermediate portions 3M may camber slightly so that the setbacks with respect to the envelope of the bushing (see above) in the middle zone of the tongues decrease and the final setback of each tongue 3 may be near the value zero. In other words, the initial setback of tongues 3 is defined such that during their elastic deformation, the middle zones of surfaces 3T, which by definition are the highest portions during clamping, do not project over the outer envelope of bushing 1 and do not enter into conflict with the surrounding elements of the mandrel in any case.

Both an introduction of cuttings and of other foreign bodies into the interior of the bushing and their buildup on the frustoconical portions 2E when opening and closing the bushing are avoided, thereby ensuring an excellent quality of the work as any foreign bodies that might be caught between the frustoconical surfaces 2E and the corresponding clamping surfaces of the movable piston and of the clamping cap would cause a loss in precision of the machining operations.

In a general manner, each segment 2 is connected to a neighboring segment 2 while rigidity and resilience are ideally combined when the resisting and the actuating forces during opening and closing of the bushing are applied under the action of the clamping piston. The design characteristics of the flexible guide bushing (dimensions of seats 8 and of tongue 3, choice of the elastic material of the tongues) are determined as a function of the aforementioned constraints that have to be respected.

In a known manner, a given bushing among an entire set will be used for machining bars of a defined diameter that is in turn comprised in a given range (for example, ranges of 0.2 mm, 0.3 mm, or 0.5 mm according to the bar diameter).

The segments of the bushing of the invention can be made from metallic (e.g. from hardened steel, cast iron, bronze) or synthetic materials. In particular it is possible to affix a hard metal jacket 9 (depicted in FIGS. 1 and 4) to each segment, e.g. by brazing. This jacket may extend on part or on the entire length of each of segments 2, e.g. on a distance from their front sides 2F, as shown in FIGS. 1 and 2. In this manner, the segments of the bushing may be manufactured from a usual metallic or synthetic material and comprise a jacket of a more sophisticated hard material such as tungsten carbide or ceramics.

The novel design of the connections between segments 2 by means 3, i.e. axial rather than radial connections that can furthermore be provided on the entire length of the bushing, offers a large number of advantages that are grouped under the following ten points:

(1) perfect stability of the bushing in operation due to
uniform distribution and constancy of the forces that are present, more particularly of the forces between the clamping segments, on one hand, and on the other hand, of the gripping, i.e. clamping forces, applied to the bars to be machined, in spite of variations in diameter of the raw bars to be machined, and
uniform and constant distribution of the rigidity, thereby ensuring a perfect alignment and parallelism of the segments on the entire length of the bushing;

(2) perfect machining uniformity due to the possibility of performing a pre-machining of the material by reducing it by 0.2 to 0.3 mm and then retracting the material inside the bushing, which will automatically adapt to the new diameter so that material faults are substantially eliminated in the second turning operation;

(3) penetration of chips into the bushing and buildup of cuttings on the conical end portions are prevented;

(4) possibility of machining bars having large diameter irregularities, with the result that it turns out that a cutout in the center of the bushing is unnecessary;

(5) clamping flexibility while maintaining the positions of the segments;

(6) reliability of the stability over a prolonged period due to the absence of elements that may be altered mechanically, on one hand, and on the other hand, to the reduction of the friction coefficient thanks to the uniform distribution of the forces and frictions over the entire length of the bushing;

(7) minimal wear;

(8) the possibility of machining all metals including soft metals, certain titaniums, graphites, and synthetic materials;

(9) reduced space requirement;

(10) simple general shape and reduction of the manufacturing costs to a minimum.

What is claimed is:

1. A guide bushing for a machine tool, comprising
   at least two segments, each segment having a main section, two frustoconical, opposite end portions and two opposite sides; and
   an elastic connection connecting each side of each segment to the side of a neighboring segment to form a body of revolution having an envelope axis and having a central opening that allows passage of a bar that is to be machined, each of the elastic connections extending axially along the axis in a seat of the guide bushing for the elastic connection, the seat of the guide bushing including a facing arrangement of cutouts of two neighboring ones of the segments, so that in a closed condition of the bushing, the elastic connection in the cutout is at least approximately flush, over at least part of its axial extension, with the envelope of the bushing, without projecting from the envelope, both of said cutouts comprising a flat surface orthogonal to a radial axis of the guide bushing, each of the elastic connections not extending below said flat surfaces of said cutouts;
   each of the elastic connections comprising a tongue having a visible surface, the tongue comprising an intermediate portion and opposite end portions that are chamfered; the intermediate portions of the tongues corresponding in axial locations to the main section of the segments connected by the elastic connections; the tongue of the elastic connections including a visible surface that is slightly set back with respect to edges of the cutout provided in each of the segments, the tongue of the elastic connections including an inner surface opposed to the visible surface, the inner surface being in contact with the seat, on said flat surfaces of said cutouts.

2. A guide bushing according to claim 1, wherein the two sides of each segment comprise two longitudinal flanks, each of the flanks having a flat and a shoulder in order to form the cutout.

3. A guide bushing according to claim 1, wherein each tongue has a length that corresponds at least approximately to a total length of the bushing.

4. A guide bushing according to claim 2, wherein the tongue has a defined width so that a defined distance between two facing flanks provides a mutually assembled condition of the segments.

5. A guide bushing according to claim 1, wherein the tongue has a defined height such that it does not project from the outer envelope of the bushing in the assembled condition of the segments.

6. A guide bushing according to claim 1, wherein the segments are made of a metallic or synthetic material.

7. A guide bushing according to claim 1, further comprising a jacket extending on part or on the entire length of the segments.

8. A guide bushing according to claim 7, wherein the jackets are made of a hard material.

9. A guide bushing according to claim 1, wherein the envelope of the bushing is cylindrical in the main section between the frustoconical portions.

10. A guide bushing according to claim 7, wherein the jacket is made of tungsten or ceramics.

11. A guide bushing according to claim 1, wherein the bushing is for an automatic lathe.

* * * * *

UNITED STATES PATENT AND TRADEMARK OFFICE
CERTIFICATE OF CORRECTION

PATENT NO.       : 8,590,435 B2                              Page 1 of 1
APPLICATION NO. : 13/124539
DATED            : November 26, 2013
INVENTOR(S)      : Daniel Dünner It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 256 days.

Signed and Sealed this
Twenty-second Day of September, 2015

Michelle K. Lee
*Director of the United States Patent and Trademark Office*